April 26, 1949. C. A. ESCOFFERY 2,468,051
RECTIFIER
Filed July 22, 1947 2 Sheets-Sheet 1
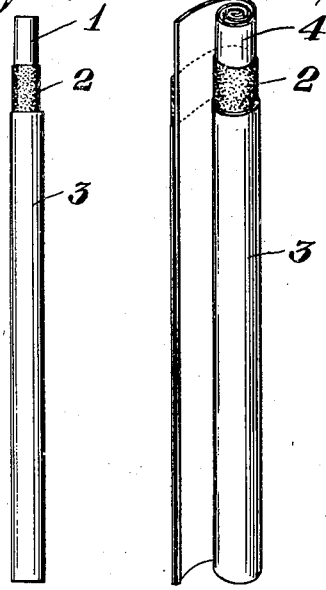
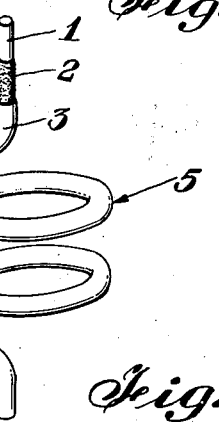
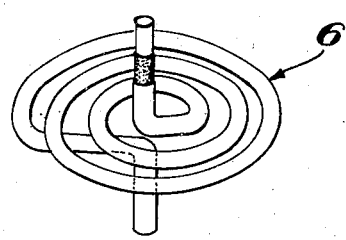
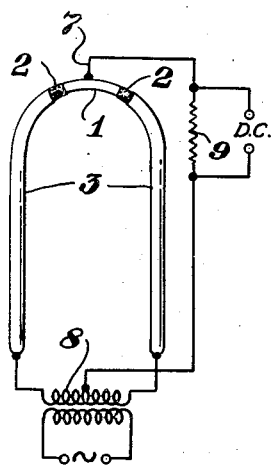
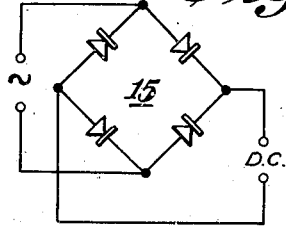
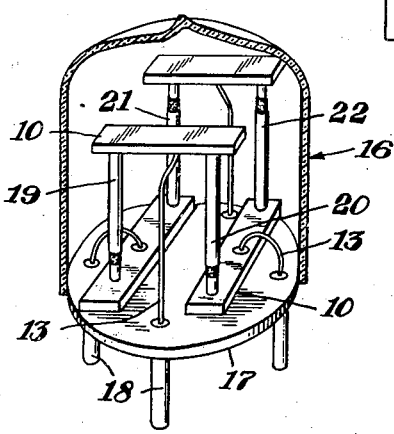
INVENTOR.
CHARLES A. ESCOFFERY
BY Percy P. Lautzy
ATTORNEY April 26, 1949.　　　C. A. ESCOFFERY　　　2,468,051
RECTIFIER
Filed July 22, 1947　　　　　　　　　　2 Sheets-Sheet 2
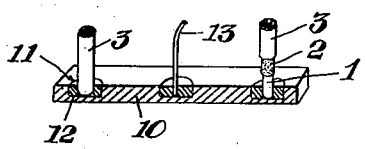
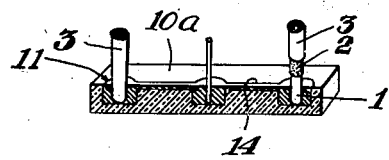
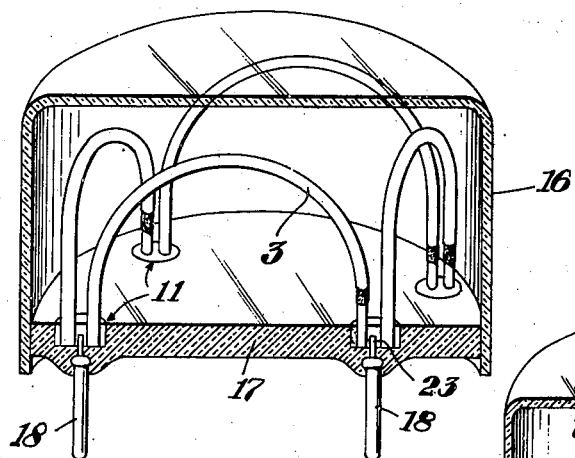
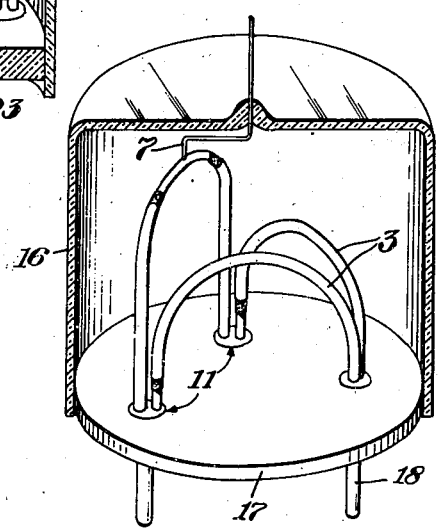
INVENTOR.
CHARLES A. ESCOFFERY
BY Lucy P. Lantz
ATTORNEY Patented Apr. 26, 1949

2,468,051

UNITED STATES PATENT OFFICE 2,468,051

RECTIFIER

Charles A. Escoffery, East Orange, N. J., assignor to Federal Telephone and Radio Corporation, New York, N. Y., a corporation of Delaware Application July 22, 1947, Serial No. 762,695

8 Claims. (Cl. 175—366)

My invention relates to rectifiers and is particularly directed to improvements in assemblies of rectifiers of the semi-conductor type.

In the co-pending application of Charles A. Escoffery and Walter H. Hawk, filed Oct. 26, 1946, Serial Number 705,874, and assigned to the assignee of this application, is described a dry plate rectifier of the semi-conductor type which in external appearance is a rod that may be twisted, folded or wound into any desired shape. Opposite ends of the rod comprise the electrical terminals of the rectifier.

An object of this invention is to provide a simple, unitary structure for mounting and housing the rod-like rectifier elements of the Escoffery-Hawk application, supra.

Another object of my invention is to provide unitary mounting means for said rod-like rectifier elements for holding the elements and for electrically connecting the elements to terminal connectors.

Other objects will appear as this description proceeds, the scope of the invention being defined in the appended claims and exemplary embodiments thereof being shown in the accompanying drawing, in which:

Figs. 1 and 2 show in elevation rod-like rectifier elements of this and of the mentioned Escoffery-Hawk application;

Figs. 3 and 4 show the rectifier elements of Fig. 1 or 2 wound into cylindrical and flat coils, respectively, for compactness;

Fig. 5 shows in elevation a U-shaped double rectifier;

Fig. 6 is a wiring diagram of one assembly of my rectifiers;

Fig. 7 shows in perspective and partly in section one assembly of the straight rectifier elements of Fig. 1 or 2 mounted in a sealed envelope according to my invention;

Figs. 8 and 9 are sectional detail views of Fig. 7, and

Figs. 10 and 11 are perspective views of alternative assemblies of rectifiers mounted in envelopes according to my invention.

The rectifier element of Fig. 1 comprises a solid or hollow rod 1 of metal, exteriorly coated for substantially its length with a semi-conducting layer 2, one end only of the rod being exposed. The semi-conducting layer is in turn covered with an adherent layer 3 of the counter-electrode. The elongated round rectifier element may, alternatively, be fabricated by applying the semi-conductor coating 2 and layer 3 to both sides of a thin sheet of base metal 4, as shown in Fig. 2, and rolled into a rod-like cylinder. The exposed edge of the sheet at one end of the roll and the counterelectrode layer comprise the two terminals of the roll.

Now, each rod shaped rectifier may be wound into the helix 5 of Fig. 3 or the flat spiral 6 of Fig. 4, or into any shape best suited for compactness in the desired mounting. Also, the rod may be tapped at an intermediate point and the portions of the rod between the tap separately treated with semi-conducting and counter-electrode layers. Two such rectifier portions on one rod are shown in Fig. 5, where a terminal 7 is connected to the exposed center of the core or rod 1. Such a double rectifier is adapted for full wave rectification and may be connected to an alternating current source 8 and a direct current load 9 as shown. The rectifier rods, whether they constitute single or double rectifiers, may be variously shaped as indicated in Figs. 5, 8, 10 and 11.

Novel mechanical support for and electrical connection to the rod-shaped rectifier elements are disclosed. The ends of the rods are inserted in recesses in receptacles of metal or insulating material and low-melting solder is cast in the recesses about the ends of the rods. Two or more rectifier terminals and connecting wires may be cast in the same body of solder for electrically connecting the rectifiers and wire. In Fig. 8, the bus-bar 10, which is of metal, constitutes the receptacle in the recesses 11 of which are inserted the ends of the rectifier rods. About the rod ends, is poured molten solder 12 which when set mechanically and electrically interconnects the rectifiers with the bus-bar. The connecting wire 13 is similarly cast in a body of solder in the bar, the wire connection being either made in a separate recess as shown, or in the recess with the rectifier element.

Alternatively, the solder receptacle 10a may be of insulating material such as ceramic, glass or hard plastic, as shown in Fig. 9. Here, electrical continuity between the rectifiers or between rectifiers and wire conductors is effected by casting a ribbon 14 of the solder in a groove or channel between the recesses. The cast connections are strong, have low contact resistance, and are quickly and easily made without damage to the thin coated materials on the rectifier rods.

According to my invention, the rod rectifiers shown are electrically connected in the four sides of the bridge circuit 15 of Fig. 6 and are assembled in a compact unitary structure for mounting in a hermetically sealed envelope. The envelope, shown in Fig. 7, comprises a glass bulb 16, though a metal bulb could be used, with a button type press 17 sealing and holding the contact pins 18. Four straight rectifier rods 19, 20, 21 and 22 are employed in this particular embodiment, the ends of the rods being electrically connected to and mechanically anchored by the bus-bars 10. Each bus-bar is connected to the terminals of two rectifiers and to one lead-in conductor 13. Each conductor connects with one of the base pins 18.

The four straight rectifier rods of Fig. 7 are preferably stood on end with the two lower bus-bars resting on the header 17 of the envelope or supported on studs embedding in the header. The bulb is lowered over the assembly and the rim is sealed to the edge of the header by a conventional glass-to-glass seal. Alternatively, the glass parts may be metalized in the seal regions, as by cathodic sputtering, and the glass parts then joined by soldering or brazing. The envelope may be entirely or partially exhausted or filled with an inert or reducing gas to insure against corrosion of the rectifier parts.

If a larger current carrying capacity is desired than can be provided with the straight rectifier rods in a given envelope, the length of the rods may be increased by coiling the rod as shown in Figs. 3 or 4 and installing in the envelope. The bus-bars may be attached and the connections made as with the straight rods.

Instead of separate bus-bars, the pools of solder may be cast in recesses in the glass header 17, as shown in Fig. 10. The upper surface of the header is molded with four recesses 11 into which the ends of the U-shaped rectifier rods are lowered, two rectifier ends in each recess. Molten solder is poured into the recesses and after cooling, the rectifier loops are firmly held in upstanding position. Excellent electrical connection between the rectifier terminals and contact pins 18 may be made by exposing the inner end 23 of a pin in each of the recesses to the solder. The rectifier elements may be so polarized that the direction of current flow between the several pins are as suggested for the bridge circuit of Fig. 6. The finished mount is finally enclosed with an envelope bulb, the header being telescoped into the bulb and the circular junction of bulb and header being sealed, as by heating and fusing the glass.

In Fig. 11 the U-shape double rectifier, of Fig. 5, is incorporated in a four-sided bridge, the double rectifier being employed to serve two sides of the bridge. The lead-in conductor 7 for the common terminal may be sealed through the header, or if desired, through the bulb as shown.

The dry-plate semi-conductor rectifiers are mounted according to my invention in compact unitary structures with contact pins that are easily inserted or replaced in circuits as radio tubes or similar plug-in devices. The rectifier elements are protected from mechanical damage and from atmospheric corrosion.

I claim:

1. A unitary rectifier assembly comprising a plurality of rod-shaped rectifier elements of the semi-conductor type, each rod-shaped element having terminals at each end, a connector for each rectifier terminal comprising a receptacle having a recess to receive said terminal, and a low melting solder in said recess adhering to said terminal, and electrical connections between selected bodies of said solder.

2. A rectifier assembly comprising at least two rod-shaped rectifiers of the semi-conductor type, a bus-bar having at least two recesses, one end of said rectifiers extending into selected ones of said recesses, and bodies of solder in said recesses about the ends of the rectifiers.

3. A unitary rectifier assembly comprising a plurality of rectifier elements of the semi-conductor type, an envelope enclosing said elements, said envelope consisting of a bulb closed at one end with a header, a plurality of contact pins carried on said header, and electrical connections between said elements and said pins, including receptacles to receive ends of said elements and said pins and solder in said recess connecting said ends.

4. A unitary rectifier assembly comprising a plurality of rod-shaped rectifier elements of the semi-conductor type, a planar rigid body of insulating material, a plurality of recesses in said body with the ends of said rectifier elements extending into said recesses, and a mass of low-melting metal in said recesses about the ends of said elements to mechanically anchor said elements to said body.

5. A unitary rectifier assembly comprising an envelope bulb closed at one end with a button-type header of insulating material, a recess being in the inner surface of said header, a rod-shaped rectifier element with one end in said recess, and a mass of solder in said recess about the end of the rectifier element.

6. A unitary rectifier assembly comprising a plurality of rod-shaped rectifier elements of the semi-conductor type, a bus-bar mechanically connected to and electrically interconnecting the ends of selected pairs of said elements; said bus-bar comprising a bar of metal, the ends of said rectifier elements being soldered in recesses in said bar.

7. A unitary rectifier assembly comprising a plurality of rod-shaped rectifier elements of the semi-conductor type, a bus-bar mechanically connected to and electrically interconnecting the ends of selected pairs of said elements; said bus-bar comprising a bar of insulating material, said bar having spaced recesses and a communicating channel, the ends of said rectifier elements extending into said recesses, and a conducting material cast in said recesses and channel.

8. A rectifier assembly comprising a rectifier element, a planar body of insulating material having a recess, a contact pin supported on said body and having one end extending into said recess, one terminal of said rectifier also extending into said recess, and a body of solder contained in said recess to mechanically and electrically unite said terminal and contact pin in said body.

CHARLES A. ESCOFFERY.

REFERENCES CITED

The following references are of record in the file of this patent:

UNITED STATES PATENTS

| Number | Name | Date |
| --- | --- | --- |
| 1,723,579 | Ruben | Aug. 6, 1929 |
| 1,794,037 | Shoemaker | Feb. 24, 1931 |
| 2,189,617 | Siebert et al. | Feb. 6, 1940 |